Sept. 17, 1957     E. F. FROST, JR     2,806,378
APPARATUS FOR TRANSFORMING ROTARY MOTION TO RECIPROCATING MOTION
Filed June 8, 1954     2 Sheets-Sheet 1
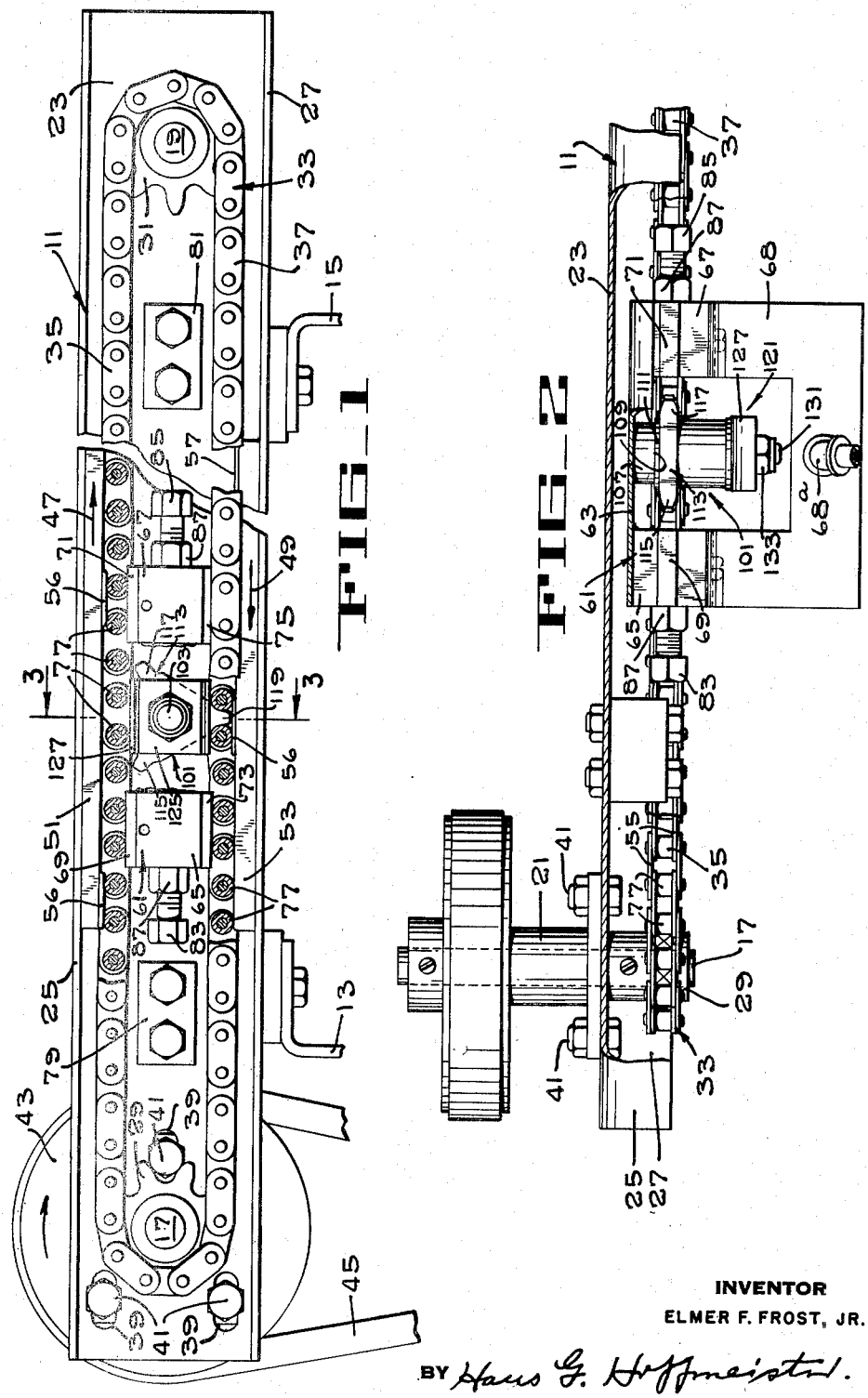
INVENTOR
ELMER F. FROST, JR.
BY
ATTORNEY

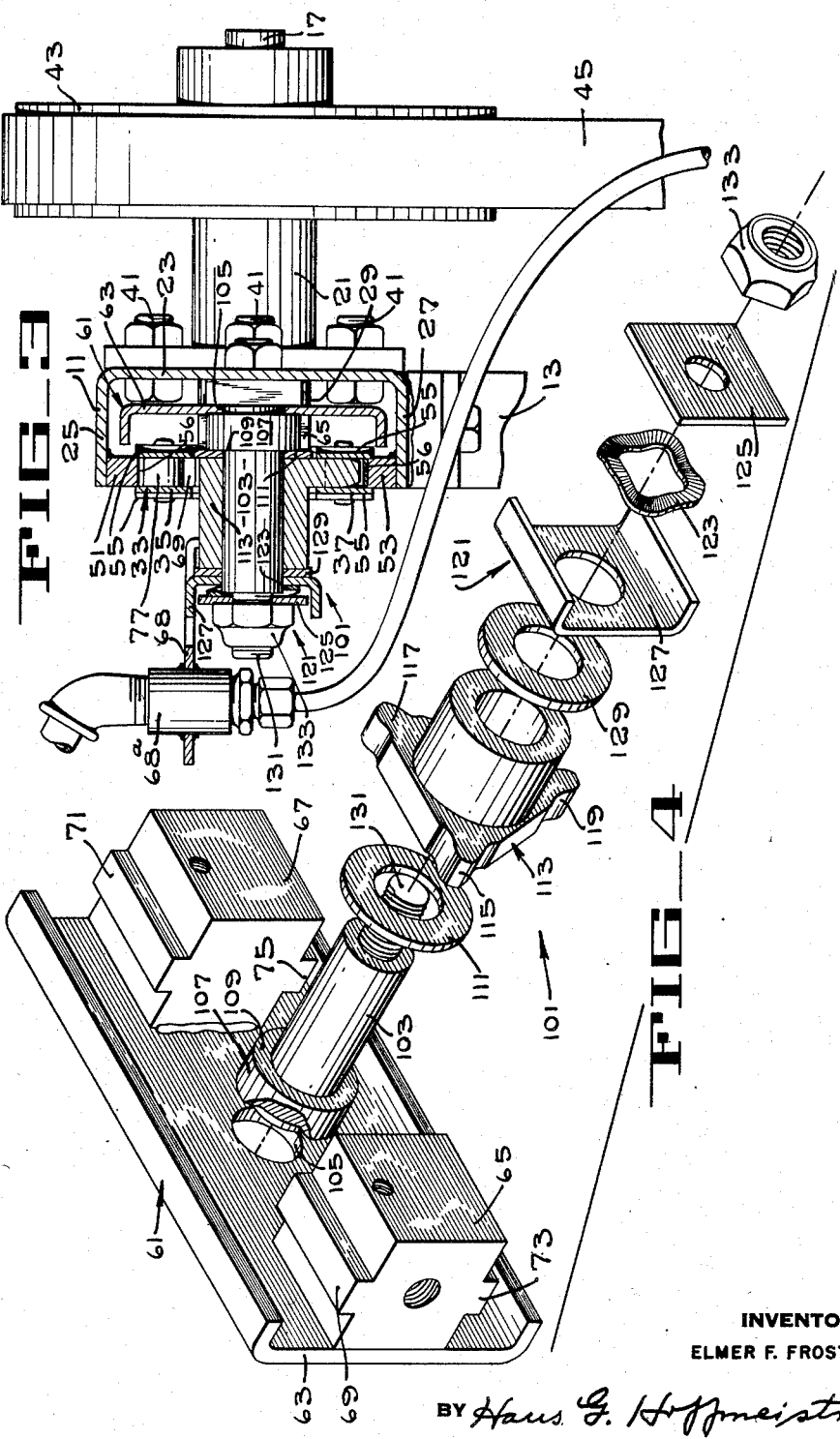

United States Patent Office 2,806,378
Patented Sept. 17, 1957

2,806,378

APPARATUS FOR TRANSFORMING ROTARY MOTION TO RECIPROCATING MOTION

Elmer F. Frost, Jr., Lakeland, Fla., assignor to Food Machinery and Chemical Corporation, San Jose, Calif., a corporation of Delaware Application June 8, 1954, Serial No. 435,183

12 Claims. (Cl. 74—37)

This invention relates to an apparatus for transforming rotary motion to reciprocating motion and more particularly to such apparatus which employs a reciprocable carriage adapted to be alternately connected to parallel, oppositely moving drive elements actuated by rotatable means.

One object of the present invention is to provide a new and improved apparatus for transforming rotary motion to reciprocating motion.

Another object is to provide an apparatus of the type described above wherein the reciprocable carriage is supported and guided by the drive elements.

Another object is to provide an apparatus of the above mentioned type which is quiet and in which wear is reduced to a minimum.

Another object is to provide an apparatus of the type described above that is inexpensive and which requires a minimum of maintenance.

These and other objects and advantages of the present invention will become apparent from the following description and the accompanying drawings wherein:

Fig. 1 is a fragmentary elevation of the apparatus of the present invention.

Fig. 2 is a fragmentary plan view of the apparatus shown in Fig. 1.

Fig. 3 is a section taken along the line 3—3 of Fig. 1.

Fig. 4 is an exploded perspective of a portion of the present apparatus.

The apparatus of the present invention comprises an elongated U-shaped channel 11 (Fig. 1) supported horizontally by angles 13 and 15 and extending in a direction parallel to that of the reciprocating motion produced by the apparatus. Shafts 17 and 19 are journaled in bearings 21 (only one of which is shown) secured to the web 23 of the channel 11 adjacent its opposite ends. The shafts 17 and 19 project forwardly into the space between the legs 25 and 27 of the channel 11 and said shafts have sprockets 29 and 31, respectively, securely mounted thereon. An endless roller chain 33 having upper and lower reaches 35 and 37, respectively, is trained around the sprockets 29 and 31 and is adapted to be drawn tight by adjustment of the sprocket 29 whose supporting bearing 21 is adjustably mounted on the channel 11 by means of slots 39 and cooperating machine bolts 41. The sprocket 29 is adapted to be rotated clockwise (Fig. 1) by any convenient means, such as a pulley 43 secured to the sprocket shaft 17 and operatively connected with a source of power (not shown) through a belt 45. Such clockwise rotation of the sprocket 29 will cause the upper and lower reaches 35 and 37 of the endless chain 33 to continuously travel in opposite directions, namely, in the directions of the arrows 47 and 49, respectively (Fig. 1). The chain reaches 35 and 37 are guided in their movement by rails 51 and 53, respectively, which are secured to the inner sides of the channel legs 25 and 27 at their free ends, and extend in guiding relation between the opposite side bars 55 of the chain 33 at the outer periphery thereof, as seen in Figs. 1 and 3. The rails 51 and 53 have two triangular groups of identical cam or guide plates 56 and 57 (Fig. 1) welded to the inwardly facing surfaces of the rails adjacent their ends. The plates 56 at the left end of the rails 51 and 53 (Fig. 1) are so arranged that the rail 51 has two spaced plates 56, 56 and the rail 53 has one plate 56 which is attached to said rail 53 at a point intermediate the points of attachment of the plates 56, 56 to the rail 51. At the right end of the rails 51 and 53 (Fig. 1) the arrangement of the cam plates 57 is reversed, two spaced plates 57, 57 (only one of which is shown) being secured on the rail 53 and only one plate 57 (not shown) being attached to the rail 51 at a point intermediate the point of attachment of the plates 57, 57 to the rail 53. The function of these cam plates 56 and 57 is to cause the chain reaches 35 and 37 to travel closer to each other near the ends of the rails 51 and 53 than they do along the remainder of their paths, for a purpose to be presently disclosed.

The lower reach 37 of the endless chain 33 supports a carriage 61 (Fig. 4) comprising a channel 63 having blocks 65 and 67 welded to its web adjacent its ends. A U-shaped bracket 68 (Fig. 2) is bolted to the forward face of the blocks 65 and 67 and is adapted to carry a device to be reciprocated, such as a wax distributing nozzle 68a (Figs. 2 and 3). Said blocks 65 and 67 are provided with upper and lower runners 69 and 71 (Fig. 4), and 73 and 75, respectively, which extend in guiding relation between the opposite side bars 55 of the chain 33 at the inner periphery of the chain, as best seen in Figs. 1 and 3. The lower runners 73 and 75 rest on the chain rollers 77 in the lower chain reach 37 while the upper runners 69 and 71, although they extend between the side bars 55 of the upper chain reach 35, do not normally contact the rollers 77 in the upper chain reach 35. In this manner the carriage 61 is supported by the lower chain reach 37 and guided by the reaches 35 and 37 for reciprocating motion therealong. The limits of this reciprocating motion are determined by two stops 79 and 81 bolted to the forward face of the web 23 of the channel 11 and protruding between the chain reaches 35 and 37. Tap bolts 83 and 85 provided with the lock nuts 87, 87 extend from the outer lateral faces of the blocks 65 and 67, respectively, said bolts being arranged to abut against the stops 79 and 81 when the carriage 61 reaches the desired extremes of its movement.

Reciprocating motion of the carriage 61 between the stops 79 and 81 is obtained through alternate connection of the carriage 61 with the oppositely moving chain reaches 35 and 37. Such connection is established by means of a clutch 101 (Figs. 3 and 4) mounted on the carriage 61 between the blocks 65 and 67 and comprising a stud 103 welded in a hole 105 in the web of the channel 63 and projecting forwardly therefrom. The stud 103 is formed near its rear end with a boss 107 which aids in the proper positioning of the stud in the hole 105 and provides an annular shoulder 109 against which a thrust washer 111 bears. The stud 103 rotatably supports a sprocket 113 having three equally spaced teeth 115, 117 and 119 adapted for alternate engagement with the upper and lower reaches 35 and 37 of the chain 33. The sprocket 113 is urged against the thrust washer 111 by a pressure exerting device 121 mounted on the stud 103 and comprising a spring washer 123 flanked by an apertured square plate 125 and a U-shaped apertured channel 127 spaced from the hub of the sprocket 113 by a thrust washer 129. The free forward end 131 of the stud 103 is reduced in diameter and threaded in order to mate with a nut 133 adapted to bear against the square plate 125. Through adjustment of the nut 133 the pressure exerted by the device 121 against the sprocket 113 and thus the friction between the sprocket 113 and the thrust washers 111 and 129 may be varied in order to regulate the force necessary to rotate said sprocket on the stud 103.

In operation, with the pulley 43 continuously rotating in a clockwise direction (Fig. 1) the sprocket 29 will drive the chain 33 so that the upper and lower chain reaches 35 and 37 will continuously move in the opposite directions indicated by the arrows 47 and 49, respectively. By turning the nut 133 the clutch 101 may be adjusted so that when any one of the teeth of the clutch sprocket 113 is engaged with either of the chain reaches 35 or 37, the sprocket 113 will not be rotated thereby, and the engaged chain reach, through the clutch 101, will move the carriage 61 in the direction of movement of the engaged reach. With the clutch 101 so adjusted and, for example, with the sprocket tooth 119 engaged with the lower chain reach 37, said reach will convey the carriage 61 toward the left, as shown in Fig. 1, until the head of the tap bolt 83 strikes the stop 79, thereby preventing further movement of the carriage 61 toward the left. After the movement of the carriage 61 has been thus arrested, the continued movement of the lower chain reach 37 toward the left will rotate the sprocket 113 clockwise (Fig. 1) against the frictional forces imposed thereon by the pressure exerting device 121, thus causing the sprocket tooth 115 to move into engagement with the upper chain reach 35 for movement of the carriage 61 toward the right. To assure that when the sprocket 113 is rotated its teeth will mesh with the flights of the chain 33, the tap bolts 83 and 85 may be suitably adjusted in the blocks 69 and 73 to interrupt the carriage travel at the exact instant at which rotation of the sprocket will bring one of its teeth into timed engagement with the chain 33.

At the instant the carriage 61 stops, the chain-engaging tooth 119 of the sprocket 113 is opposite the lone cam plate 56 on the rail 53 and the upper runners 69 and 71 are opposite the cam plates 56, 56 on the rail 51. In this position of the carriage 61 the portion of the upper chain reach 35 between the cam plates 56, 56 on the rail 51 is depressed by said plates so that its rollers 77 are moved into contact with the upper runners 59 and 71 thereby preventing vertical movement of the carriage 61. Also at this carriage position the portion of the lower chain reach 37 opposite the engaged tooth 119 is raised by the lone cam plate 56 on the rail 53 so that said tooth is more deeply engaged than normal with the chain reach 37. As a consequence, during rotation of the sprocket 113 by the chain reach 37, said reach will remain in contact with the tooth 119 longer than it would in the absence of the cam plates 56 and the chain reach 37 will, therefore, rotate the sprocket 113 through a greater angle than it would if said cam plates 56 were not present. The increase in the amount of rotation of the sprocket 113 thereby attained causes the tooth 115 to become fully engaged between adjacent rollers 77 of the upper chain reach 35 and so positions the tooth 119 that when the carriage 61 moves to the right beyond the cam plates 56, said tooth 119 will be a substantial distance out of the path of the lower chain reach 37. Such positioning of the tooth 119 assures that it will not contact the chain reach 37 while the sprocket 113 is engaged with the reach 35, which contact would cause undesired noise and would wear both the chain 33 and the teeth of the sprocket 113.

Upon the above mentioned full engagement of the sprocket tooth 115 with the upper chain reach 35 said reach will slide the carriage 61 to the right (Fig. 1) on the rollers 77 of the lower chain reach 37, the device 121 imposing sufficient frictional force on the sprocket 113 to prevent its rotation. When the tap bolt 85 strikes the stop 81, thus halting the movement of the carriage 61 to the right (Fig. 1), the upper chain reach 35 will swing the sprocket 113 clockwise thereby removing the tooth 115 from engagement with the upper reach 35 and engaging the tooth 117 with the lower reach 37, whereupon the carriage 61 will again travel to the left (Fig. 1). During the above described clutch shifting operation, the plates 57 at the right end of the rails 51 and 53 operate in the manner previously described in connection with the plates 56 to assure a full engagement of the tooth 117 with the lower chain reach 37 and to place the tooth 115 in a position where it will not contact the upper chain reach 35. From the above it will be seen that in the present apparatus the carriage 61 will continuously reciprocate between the stops 79 and 81 as long as rotary motion is imparted to the pulley 43.

While I have described a preferred embodiment of the present invention it will be understood that various changes and modifications may be made in the details thereof without departing from the spirit and scope of the appended claims.

Having thus described my invention, what I claim as new and desire to protect by Letters Patent is:

1. A mechanical movement comprising drive means having a first reach continuously movable in one direction adjacent a predetermined path and a second reach spaced from said first reach and continuously movable in an opposite direction adjacent said predetermined path, a carriage supported entirely by one of said reaches for movement in said predetermined path, and means on the carriage arranged to be moved alternately into engagement with said first and second reaches for reciprocating said carriage in said predetermined path.

2. A mechanical movement comprising a drive chain having a first reach continuously movable in one direction adjacent a predetermined path and a second reach spaced from said first reach and continuously movable in an opposite direction adjacent said predetermined path, said chain including rollers at spaced intervals therearound and laterally spaced bars interconnecting adjacent rollers, a carriage having a runner thereon adaptable for positioning between said bars and engageable with said rollers to entirely support and guide said carriage on one of said reaches for reciprocation in said predetermined path, and means for operatively connecting said carriage alternately with said first and second reaches for reciprocating said carriage in said predetermined path.

3. An apparatus for converting rotary motion to reciprocating motion comprising a pair of spaced rotatable members, an endless flexible chain trained around said pair of rotatable members providing two substantially parallel reaches, said chain comprising rollers at spaced intervals therearound, means for rotatably driving one of said rotatable members to cause said reaches to continuously move in opposite directions, a carriage having a runner thereon engageable with said rollers to support said carriage on one of said reaches for reciprocating movement in a predetermined path therealong, a clutch supported by the carriage and shiftable to alternately engage said oppositely moving reaches to move the carriage first in the direction of movement of one reach and then in the direaction of movement of the other reach, a stop arranged at each end of said predetermined path to arrest the movement of the carriage whereby the reach of the flexible chain with which thte clutch is engaged as the carriage contacts each stop will move the clutch into engagement with the other reach, and means on said carriage for maintaining the unengaged reach out of contact with said clutch.

4. A mechanical movement comprising a carriage reciprocable in a predetermined path, drive means having two substantially parallel reaches adapted for continuous movement in opposite directions adjacent said predetermined path, a clutch alternately engageable with said reaches for reciprocating thte carriage in said predetermined path, means at each end of said predetermined path to cause the clutch to shift from engagement with one of said reaches to engagement with the other of said reaches, and guide means mounted in fixed position adjacent each end of said path for prolonging the engagement between said one reach and the clutch after the clutch has engaged the other reach until the clutch has been withdrawn from its position of engagement with said one reach to a position wherein it will be spaced from said one reach throughout the return movement of the carriage.

5. A mechanical movement comprising a carriage reciprocable in a predetermined path, drive means having two substantially parallel chain reaches adapted for continuous movement in opposite directions along said predetermined path, a clutch having a sprocket rotatably mounted on said carriage for alternate meshing with said chain reaches to reciprocate said carriage in said predetermined path, means at each end of said predetermined path to cause said clutch sprocket to shift from meshing engagement with one of said chain reaches to meshing engagement with the other of said chain reaches, and guide means mounted in fixed position adjacent each end of said path for increasing the depth of engagement between said clutch sprocket and the engaged one of said chain reaches during thte shifting of said clutch sprocket into meshing engagement with the other of said chain reaches.

6. A mechanical movement comprising a carriage reciprocable in a predetermined path, drive means having two substantially parallel chain reaches adapted for continuous movement in opposite directions adjacent said predetermined path, a clutch having a sprocket rotatably mounted on said carriage for alternate meshing with said chain reaches to reciprocate said carriage in said predetermined path, means at each end of said predetermined path to cause said clutch sprocket to shift from meshing engagement with one of said chain reaches to meshing engagement with the other of said chain reaches, and guide means mounted in fixed position adjacent each of said sprocket shifting means for decreasing the distance between said chain reaches adjacent said clutch sprocket during shifting thereof to increase the duration of the meshing engagement between the engaged one of said chain reaches and said clutch sprocket.

7. A mechanical movement comprising an endless chain trained around two spaced supporting sprockets to provide two substantially parallel reaches, means for rotating one of said supporting sprockets to move said chain reaches in opposite directions, a carriage having a first set of spaced runners resting on one of said chain reaches to entirely support said carriage for reciprocation in a predetermined path between said supporting sprockets and a second set of spaced runners removed from said first set of runners and arranged to contact the other of said chain reaches to normally maintain said reaches a predetermined minimum distance apart, a clutch having a sprocket rotatably mounted on said carriage between said sets of runners and alternately engageable with said reaches for reciprocating said carriage in said predetermined path, stops in the path of said carriage to cause said clutch sprocket to be shifted from engagement with one of said reaches to engagement with the other of said reaches at the ends of said predetermined path, and means decreasing the distance between said chain reaches adjacent said clutch sprocket during the shifting of said clutch sprocket.

8. A mechanical movement comprising an endless roller chain trained around two horizontally spaced supporting sprockets to provide substantially parallel, upper and lower, horizontal reaches, means for rotating one of said supporting sprockets to move said chain reaches in opposite directions, a carriage having a first set of horizontally spaced runners resting on the lower reach of said chain to support said carriage for reciprocation in a predetermined path between said supporting sprockets and a second set of horizontally spaced runners above said first set of runners to normally maintain said upper chain reach a predetermined minimum distance from the lower chain reach, a clutch having a three-toothed sprocket rotatably mounted on said carriage between said sets of runners and alternately engageable with said upper and lower reaches for reciprocating said carriage in said predetermined path, a stop at each end of said predetermined path to cause said three-toothed sprocket to be shifted from engagement with one of said reaches to engagement with the other of said reaches upon abutment of said carriage with said stops, means adjacent the outer surfaces of said reaches to guide the same and prevent their movement outward beyond a predetermined point, and cams mounted in fixed relation to said predetermined path for decreasing the distance between said chain reaches adjacent said three-toothed sprocket during the shifting of said three-toothed sprocket.

9. Mechanism for translating rotary motion into rectilinear motion comprising spaced, rotatably mounted sprockets, a chain trained around said sprockets and including rollers at spaced intervals throughout tthe length of the chain and laterally spaced side bars interconnecting adjacent rollers and protruding beyond the rollers to present spaced-apart flanges parallel to the direction of movement of the chain, means for rotating one of the sprockets to effect rectilinear movement of the reaches of the chain, a carriage having a runner extending into the space between said flanges of one of the reaches of the chain and into engagement with the rollers of the same to support and guide the carriage by said one reach, and means for connecting the carriage to the chain.

10. Mechanism for translating rotary motion into reciprocatory rectilinear motion comprising two spaced, rotatably mounted sprockets, a chain trained around said sprockets and including rollers at spaced intervals throughout the length of the chain and laterally spaced side bars interconnecting adjacent rollers and protruding beyond the rollers to present spaced-apart flanges parallel to the direction of movement of the chain, means for rotating one of the sprockets to effect rectilinear movement of the reaches of the chain in opposite directions, a carriage having a runner extending into the space between said flanges of one of the reaches of the chain and into engagement with the rollers of the same to support and guide the carriage by said one reach, and means for connecting the carriage alternately to said reaches to effect alternate rectilinear movement of the carriage in opposite directions.

11. A motion translating device comprising a frame, two sprockets journaled thereon in spaced-apart relation, a chain trained around the sprockets and presenting two substantially parallel reaches, said chain including rollers and laterally spaced side bars pivotally supporting and interconnecting the rollers, said side bars being wider than the diameter of the rollers to present spaced parallel flanges extending inward and outward beyond the rollers in planes parallel to the reaches of the chain, means for rotating one of the sprockets to cause said reaches to move in opposite directions, a rail supported from said frame and extending into the space between outwardly extending flanges of one of the reaches of the chain and into supporting engagement with the rollers thereof, a carriage having a runner extending into the space between inwardly extending flanges of said one reach of the chain and into engagement with the rollers thereof to support and guide the carriage by said one reach, and means for connecting the carriage to the chain to be advanced thereby in rectilinear movement.

12. A motion translating device comprising a frame, two sprockets journaled thereon in spaced-apart relation, a chain trained around the sprockets and presenting two substantially parallel reaches, said chain including rollers and laterally spaced side bars pivotally supporting and interconnecting the rollers, said side bars being wider than the diameter of the rollers to present spaced parallel flanges extending inward and outward beyond the rollers in planes parallel to the reaches of the chain, means for rotating one of the sprockets to cause said reaches to move in opposite directions, a rail supported from said frame and extending into the space between outwardly extending flanges of one of the reaches of the chain and into supporting engagement with the rollers thereof, a carriage having a runner extending into the space between inwardly extending flanges of said one reach of the chain and into engagement with the rollers thereof to support and guide the carriage by said one reach, and means for connecting the carriage alternately to said reaches to effect reciprocatory rectilinear movement of the carriage.

References Cited in the file of this patent

UNITED STATES PATENTS

| | | |
|---|---|---|
| 520,827 | Koss | June 5, 1894 |
| 2,173,587 | Huffman | Sept. 19, 1939 |
| 2,309,578 | Drachman | Jan. 26, 1943 |
| 2,462,060 | Bartelt | Feb. 22, 1949 |
| 2,510,084 | Deakin | June 6, 1950 |
| 2,517,546 | Deakin | Aug. 8, 1950 |
| 2,520,131 | Deakin | Aug. 29, 1950 |
| 2,560,015 | Waldron | July 10, 1951 |